(12) United States Patent
Kiiski et al.

(10) Patent No.: US 11,718,800 B2
(45) Date of Patent: Aug. 8, 2023

(54) METHOD TO PREPARE AN AVIATION FUEL COMPONENT

(71) Applicant: Neste Oyj, Espoo (FI)

(72) Inventors: Ulla Kiiski, Porvoo (FI); Salla Likander, Porvoo (FI); Kati Sandberg, Porvoo (FI); Pirjo Saikkonen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/780,667

(22) PCT Filed: Nov. 23, 2020

(86) PCT No.: PCT/FI2020/050789
§ 371 (c)(1),
(2) Date: May 27, 2022

(87) PCT Pub. No.: WO2021/105557
PCT Pub. Date: Jun. 3, 2021

(65) Prior Publication Data
US 2023/0134111 A1    May 4, 2023

(30) Foreign Application Priority Data

Nov. 29, 2019   (FI) .................................... 20196039

(51) Int. Cl.
*C10G 67/02*    (2006.01)
*C10L 1/08*    (2006.01)
(Continued)

(52) U.S. Cl.
CPC .............. *C10G 67/02* (2013.01); *C10L 1/08* (2013.01); *C10G 2300/1014* (2013.01);
(Continued)

(58) Field of Classification Search
None
See application file for complete search history.

(56) References Cited

U.S. PATENT DOCUMENTS

2008/0161614 A1    7/2008    Bertoncini et al.
2011/0166396 A1    7/2011    Egeberg et al.
(Continued)

FOREIGN PATENT DOCUMENTS

CN    101583695 A    11/2009
CN    102149792 A    8/2011
(Continued)

OTHER PUBLICATIONS

Office Action (The First Office Action) dated Dec. 5, 2022, by the State Intellectual Property Office of People's Republic of China in corresponding Chinese Patent Application No. 202080082536.6 and an English translation of the Office Action. (15 pages).
(Continued)

*Primary Examiner* — Tam M Nguyen
(74) *Attorney, Agent, or Firm* — Buchanan Ingersoll & Rooney PC

(57) ABSTRACT

The present disclosure relates to methods for preparing aviation fuel component from a feedstock containing fossil hydrotreating feed and a second feed containing esters of fatty acids and rosins, free fatty acids and resin acids. The method includes subjecting the feedstock to hydrotreatment reaction conditions to produce a hydrotreated stream, separating the hydrotreated stream to three fractions from which at least part the highest boiling fraction is subjected to hydrocracking reaction to produce a hydrocracked stream. At least part of the hydrocracked stream is admixed with at least part of the hydrotreated stream, and their admixture is processed further until desired conversion of the feedstock to the aviation fuel component is obtained.

20 Claims, 1 Drawing Sheet

(51) Int. Cl.
*C10G 69/00* (2006.01)
*C10G 69/02* (2006.01)

(52) U.S. Cl.
CPC ............ *C10G 2300/1059* (2013.01); *C10G 2300/1077* (2013.01); *C10G 2300/301* (2013.01); *C10G 2300/308* (2013.01); *C10G 2300/4006* (2013.01); *C10G 2300/4012* (2013.01); *C10G 2300/4018* (2013.01); *C10G 2300/4081* (2013.01); *C10G 2400/08* (2013.01); *C10L 2200/043* (2013.01); *C10L 2270/04* (2013.01); *C10L 2290/24* (2013.01); *C10L 2290/543* (2013.01)

(56) References Cited

U.S. PATENT DOCUMENTS

| | | | |
|---|---|---|---|
| 2011/0219676 A1 | 9/2011 | Koyama et al. | |
| 2011/0258916 A1* | 10/2011 | Baldiraghi | C10G 3/47 44/388 |
| 2013/0072730 A1 | 3/2013 | Knuuttila et al. | |
| 2013/0174476 A1* | 7/2013 | Ramirez Corredores | C10G 3/50 44/307 |
| 2013/0216688 A1* | 8/2013 | Bruinsma | C11B 1/10 426/624 |
| 2013/0333652 A1* | 12/2013 | Trewella | C10L 1/00 585/13 |
| 2018/0265794 A1* | 9/2018 | Dahlstrand | C10G 3/50 |
| 2021/0207038 A1* | 7/2021 | Vermeiren | C10G 69/14 |
| 2021/0230490 A1* | 7/2021 | Xu | B01D 3/148 |

FOREIGN PATENT DOCUMENTS

| | | |
|---|---|---|
| CN | 102272270 A | 12/2011 |
| CN | 109952362 A | 6/2019 |
| EP | 2143777 A1 | 1/2010 |
| EP | 2 346 962 A2 | 7/2011 |
| EP | 2351821 A1 | 8/2011 |
| WO | 2010028717 A2 | 3/2010 |
| WO | 2010046590 A2 | 4/2010 |
| WO | 2012012088 A2 | 1/2012 |
| WO | 2015084935 A1 | 6/2015 |
| WO | 2019129928 A1 | 7/2019 |

OTHER PUBLICATIONS

Finnish Search Report dated Mar. 30, 2020 issued in Finnish Patent Application No. 20196039. (1 page).
Holmbom et al., "Composition of Tall oil pitch", Journal of the American oil chemistry society, 1978, 55 342-344.
International Preliminary Report on Patentability (PCT/IPEA/409) dated Oct. 1, 2021, by the European Patent Office as the International Searching Authority for International Application No. PCT/FI2020/050789.
International Search Report (PCT/ISA/210) and Written Opinion (PCT/ISA/237) dated Feb. 25, 2021, by the European Patent Office as the International Searching Authority for International Application No. PCT/FI2020/050789.

* cited by examiner

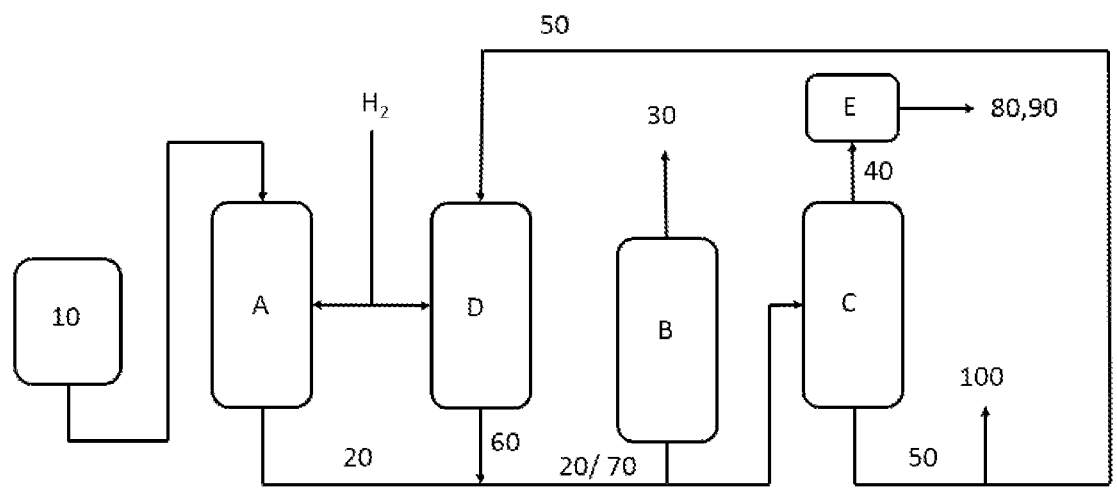

METHOD TO PREPARE AN AVIATION FUEL COMPONENT

FIELD

The present invention relates to methods for preparing aviation fuel components from a feedstock comprising fossil hydrotreatment feed and a second feed comprising esters of fatty acids and rosins, free fatty acids and resin acids.

BACKGROUND

Renewable aviation fuel demand is expected to grow in the future due to global initiatives to decrease emissions of greenhouse gases. One possibility to decrease greenhouse gas emissions is to increase the use of renewable fuels in preparation of aviation fuels. Renewable jet fuel derived from biomass, such as plants, trees, algae, waste and other organic matter bio-oils, offers an opportunity to reduce these emissions.

There are different types of aviation fuels which are strictly specified in various standards. Aircraft and engine fuel system components and fuel control units rely on the fuel to lubricate their moving parts. For example, lubricity of aviation kerosene type fuel produced by hydroprocessing is limited by the DEF STAN 91-091 standard to a maximum wear scar diameter of 0.85 mm as measured with an ASTM D5001 test method called BOCLE (ball on cylinder lubricity evaluator). The requirement to measure lubricity is applied whenever synthesized fuel components are used in a final fuel blend. Fuel lubricity is important especially in military use.

WO 2010/046590A2 disclosed a specific catalytic hydroprocessing method comprising admixing hydrotreated or hydrocracked petroleum-derived feedstock and hydrotreated or hydrocracked biologically derived feedstock followed by fractionation. The process could produce kerosene which had BOCLE lubricity of 0.58 mm according to ASTM D5001. The biologically derived feedstock suitable for the method comprised, or was formed by, vegetable and/or animal fats, at least 5% by weight fatty acids of which had a chain length less than or equal to 14 carbon atoms relative to the total weight to the triglycerides.

WO 2019/129928A1 disclosed a method comprising cracking biological based material, such as tall oil pitch (TOP) followed by fractionation to obtain kerosene. The kerosene was mixed with renewable jet fuel. BOCLE lubricities (ASTM D5001) of the fuel blends obtained were around 0.75 mm.

However, there is still need for robust methods for producing aviation fuel components from feedstocks comprising renewable material.

SUMMARY

The following presents a simplified summary in order to provide a basic understanding of some aspects of various embodiments of the invention. The summary is not an extensive overview of the invention. It is neither intended to identify key nor critical elements of the invention, nor to delineate the scope of the invention. The following summary merely presents some concepts of the invention in a simplified form as a prelude to a more detailed description of exemplifying embodiments of the invention.

It was observed that when an admixture fossil hydrotreatment feed and a feed comprising esters of fatty acids and rosins, free fatty acids and resin acids was subjected to sequential hydrotreatment and hydrocracking reaction conditions, an aviation fuel component of BOCLE lubricity fulfilling ASTM D5001 requirement for aviation fuels could be obtained.

In accordance with the invention, there is provided a new method for producing an aviation fuel component, the method comprising the following steps:
 a) providing a feedstock comprising 75-95% by weight fossil hydrotreatment feed and 5-25% by weight a second feed comprising esters of fatty acids and rosins, free fatty acids and resin acids,
 b) subjecting the feedstock to hydrotreatment reaction conditions to produce a hydrotreated stream,
 c) separating at least part of the hydrotreated stream to
  a fraction boiling below 180° C. at atmospheric pressure,
  a fraction boiling between 180° C. and 360° C. at atmospheric pressure and
  a fraction boiling above 360° C. at atmospheric pressure,
 d) subjecting at least part the fraction boiling above 360° C. at atmospheric pressure to hydrocracking reaction conditions to produce a hydrocracked stream,
 e) admixing at least part of the hydrocracked stream with at least part of the hydrotreated stream to provide a fractionation stream,
 f) separating the fractionation stream at least to
  a fraction boiling below 180° C. at atmospheric pressure,
  a fraction boiling between 180° C. and 360° C. at atmospheric pressure, and
  a fraction boiling above 360° C. at atmospheric pressure, and
 g) separating the aviation fuel component from one or more fractions boiling between 180° C. and 360° C. at atmospheric pressure.

A number of exemplifying and non-limiting embodiments of the invention are described in accompanied dependent claims.

Various exemplifying and non-limiting embodiments of the invention and to methods of operation, together with additional objects and advantages thereof, are best understood from the following description of specific exemplifying embodiments when read in connection with the accompanying FIGURES.

The verbs "to comprise" and "to include" are used in this document as open limitations that neither exclude nor require the existence of also unrecited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURE

The exemplifying and non-limiting embodiments of the invention and their advantages are explained in greater detail below with reference to the accompanying FIG. 1, which shows an exemplary system for processing a feedstock comprising fossil hydrotreatment feed and a second feed comprising esters of fatty acids and rosins, free fatty acids and resin acid to an aviation fuel component.

DESCRIPTION

Definitions

As defined herein vacuum gas oil (VGO) is heavy oils left over from petroleum distillation that can be further refined in a catalytic cracking unit.

As defined herein fossil hydrotreatment feed is a composition comprising fossil VGO and fossil gas oil components boiling below 360° C. at atmospheric pressure. An exemplary fossil hydrotreatment feed comprises naphtha, light gas oil, gas oil, light vacuum gas oil, heavy vacuum gas oil and heavy gas oil.

As defined herein tall-oil pitch (TOP) is the residue from the distillation of tall oil. It contains primarily high-boiling esters of fatty acids and rosins, free fatty acids, resin acids and unsaponifiables. Tall oil pitch can be considered to be a UVCB substance (Substances of Unknown or Variable composition, Complex reaction product or Biological materials) under the REACH definition. Composition of TOP according to Holmbom (1978) is presented in Table 1. Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

TABLE 1

Component Group Composition of Tall Oil Pitch (wt % of pitch)[a]

| Constituents | A | B | C | D | E | F |
|---|---|---|---|---|---|---|
| Free acids, total | 39.3 | 52.6 | 48.6 | 44.6 | 46.7 | 34.6 |
| Fatty acids | 1.4 | 1.8 | 1.3 | 0.8 | 1.3 | 2.4 |
| Resin acids | 10.6 | 12.5 | 9.7 | 6.1 | 3.3 | 6.5 |
| Other acids | 27.3 | 37.3 | 37.3 | 37.7 | 42.1 | 25.7 |
| Esterified acids, total | 30.6 | 23.2 | 23.3 | 26.8 | 27.9 | 37.8 |
| Fatty acids | 8.2 | 12.9 | 13.3 | 15.2 | 13.8 | 12.4 |
| Resin acids | 1.7 | 0.9 | 1.2 | 0.9 | 1.6 | 1.9 |
| Other acids | 20.7 | 9.4 | 8.8 | 10.7 | 12.5 | 23.5 |
| Equiv. weight for free acids | 648 | 591 | 716 | 642 | 873 | 719 |

[a]Holmbom B., Erä, V. 1978. Composition of Tall oil pitch, Journa of the American oil chemistry society, 55 342-344.

As defined herein a fraction boiling below 180° C., at atmospheric pressure contains more than 90 wt.-% of components having a boiling point below 180° C. (at normal pressure, i.e. about 1 bar absolute), a fraction boiling between 180° C. and 360° C., at atmospheric pressure contains more than 90 wt.-% of components having a boiling point between 180° C. and 360° C. (at normal pressure, i.e. about 1 bar absolute) and a fraction boiling above 360° C., at atmospheric pressure contains more than 90 wt.-% of components having a boiling point above 360° C. (at normal pressure, i.e. about 1 bar absolute).

As defined herein hydrotreating is the reaction of organic compounds in the presence of high-pressure hydrogen to remove oxygen (deoxygenation) along with other heteroatoms (nitrogen, sulphur, and chlorine).

As defined herein hydrocracking is a process by which the hydrocarbon molecules of petroleum are broken into simpler molecules, such as gasoline or kerosene, by the addition of hydrogen under high pressure and in the presence of a catalyst.

The principle of the method of the present invention is shown in FIG. 1. The method comprises the following steps
a) providing a feedstock 10 comprising 75-95% by weight fossil hydrotreatment feed and 5-25% by weight a second feed comprising esters of fatty acids and rosins, free fatty acids and resin acids,
b) subjecting the feedstock to hydrotreatment reaction conditions in a reactor (A) to produce a hydrotreated stream 20,
c) separating at least part of the hydrotreated stream to
a fraction boiling below 180° C. at atmospheric pressure 30,
a fraction boiling between 180° C. and 360° C. at atmospheric pressure 40 and
a fraction boiling above 360° C. at atmospheric pressure 50,
d) subjecting at least part the fraction boiling above 360° C. at atmospheric pressure to hydrocracking reaction conditions in a reactor (D) to produce a hydrocracked stream 60,
e) admixing at least part of the hydrocracked stream with at least part of the hydrotreated stream to provide a fractionation stream 70,
f) separating the fractionation stream at least to
a fraction boiling below 180° C. at atmospheric pressure,
a fraction boiling between 180° C. and 360° C. at atmospheric pressure,
a fraction boiling above 360° C. at atmospheric pressure, and
g) separating aviation fuel component 80 from one of more fractions boiling between 180° C. and 360° C. at atmospheric pressure.

The fossil hydrotreatment feed comprises typically naphtha, light gas oil, gas oil, one or more fractions of light vacuum gas oil, heavy vacuum gas oil. According an exemplary embodiment the fossil hydrotreatment feed comprises naphtha, light gas oil, gas oil, one or more fractions of light vacuum gas oil, heavy vacuum gas oil and heavy gas oil.

According to an embodiment the second feed comprises 50-100% by weight tall oil pitch, preferably 75-100% by weight tall oil pitch, more preferably 90-100% by weight tall oil pitch, even more preferably 100% by weight tall oil pitch. An exemplary second feed is tall oil pitch.

An exemplary fossil hydrotreatment feed comprises 6-32% by weight naphtha, 8-32% by weight light gas oil, 2-23% by weight gas oil, 10-47% by weight one or more fractions of light vacuum gas oil, 8-51% by weight heavy vacuum gas oil and 0-40% by weight heavy gas oil, so that sum of the components is 100%.

An exemplary feedstock comprises 80% by weight fossil hydrotreatment feed and 20% by weight a second feed comprising esters of fatty acids and rosins, free fatty acids and resin acids. Another exemplary feedstock comprises 80% by weight fossil hydrocracking feed and 20% by weight tall oil pitch.

According to an exemplary non-limiting embodiment, the method is performed in two sequential reactors (A, D) and two distillation units (B, C). Step b) of the method is performed typically in the first reactor (A) under Mild Hydrocracking process conditions (MHC). The main purpose of step b) is to remove nitrogen, sulphur and acidity of the feed. Hydrotreatment reaction conditions comprise typically LHSV 0.5-2.0 $h^{-1}$, preferably 0.7-1.2 $h^{-1}$, pressure 100-200 barg, preferably 130-160 barg, operating temperature 350-450° C., preferably 370-430° C., and $H_2$/feed 400-1000 $dm^3/dm^3$, and one or more hydrotreatment catalysts. Exemplary non-limiting reaction conditions of step b) comprise LSHV 0.8 $h^{-1}$, pressure 147 barg, temperature 380° C. and $H_2$/feed 950 $dm^3/dm^3$. The reaction is performed in the presence of one or more hydrotreating catalysts known in the art.

The separating step c) comprises typically distillation using two distillation units (B, C). The first distillation unit (B) is typically used for separating a fraction 30 boiling below 180° C. at atmospheric pressure from the hydrotreated stream 20 and the hydrocracked stream 60. The fraction 30 comprises predominantly gasoline. The remaining fractions boiling above 180° C. are fed to the second distillation unit (C) wherein a fraction 40 boiling between 180° C. and 360° C. at atmospheric pressure is separated from a fraction 50 boiling above 360° C. at atmospheric pressure. The fraction boing between 180° C. and 360° C. at atmospheric pressure comprises the aviation fuel component 80 i.e. "the kerosene fraction" and typically also diesel 90.

A part of the fraction 50 is preferably removed from the system as a bleed 100 before subjecting to hydrocracking. A preferable amount of bleed is at least 10% by weight of the fraction 50, typically 10-20% by weight of the fraction 50. The aim of the removing is to avoid accumulation of the heaviest components of the stream to system used in the method and particular to the second reactor. Furthermore, the removing is used to obtain desired level of conversion.

Step d) comprises feeding at least part of the fraction 50 to the reactor (D) for hydrocracking to give rise to the hydrocracked stream 60. Aim of step d) is to crack the hydrotreated stream further, and to obtain desired level of conversion. The hydrocracking reaction conditions of step d) comprises typically LHSV 0.5-2.0 $h^{-1}$, preferably 0.8-1.5 $h^{-1}$, pressure 100-200 barg, preferably 130-160 barg, operating temperature 330-390° C., preferably 340-380° C., and $H_2$/feed 400-1000 $dm^3/dm^3$, and one or more hydrocracking catalysts. The catalyst can be any HDO catalyst known in the art. Exemplary HDO catalysts are selected from a group consisting of NiMo-, CoMo-, NiW-catalysts and any mixtures thereof. Preferably the HDO catalyst is sulfided NiW, NiMo or CoMo catalyst.

Exemplary reaction conditions of step d) are LSHV 1 $h^{-1}$, pressure 147 barg, temperature 340° C. and $H_2$/oil feed 850 $dm^3/dm^3$. The reaction is performed in the presence of one or more hydrocracking catalysts known in the art.

In step e) at least part of the hydrocracked stream 60 is admixed with at least part of the hydrotreated stream 20 to give rise to the fractionation stream 70.

In step f) the fractionation stream is separated to a fraction boiling below 180° C. at atmospheric pressure, a fraction boiling between 180° C. and 360° C. at atmospheric pressure, and to a fraction boiling above 360° C. at atmospheric pressure. At least part of the fraction boiling above 360° C. at atmospheric pressure is recycled back to the hydrocracking step. A part of the fraction 50 is preferably removed from the system as a bleed 100 before subjecting to hydrocracking. A preferable amount of bleed is at least 10% by weight of the fraction 50, typically 10-20% by weight of the fraction 50. The process can be continued until all of the feedstock has been consumed or desired level of conversion is received.

When the process is initiated, the stream fed from the first reactor (A) to the distillation units (B,C) consists typically of the hydrotreated stream 20. When the process proceeds, the hydrocracked stream 60 is mixed with the hydrotreated stream 20, and the fractionation stream 70 is formed. Mole fraction of the hydrocracked stream may rise up to 1 when all of the feedstock has been consumed. However, the ratio of the streams 20 and 60 can be adjusted by regulating flows in the system.

In step f) the aviation fuel component 80 is separated from the one or more fractions 40 boiling between 180° C. and 360° C. at atmospheric pressure. The separating can be performed in a distillation unit such as (B). According to a preferable embodiment the separating is performed in ex situ thin film distillation column (E) to obtain a fraction boiling between 180-240° C. i.e. the aviation fuel component 80 and preferably also a fraction boiling between 240-360° C. i.e. diesel 90.

EXPERIMENTAL

Exemplary feed components used in the process are presented in Table 2. The feed contained 80% by weight fossil hydrotreatment feed and 20% by weight Tall Oil Pitch. The process conditions are presented in Table 3.

TABLE 2

Feedstock used in the experiment.

| Blend components | Cracked compounds + TOP (kg) | Cracked compounds + TOP (%) |
|---|---|---|
| naphtha | 26 | 11.1 |
| light gas oil | 38 | 16.2 |
| gas oil | 10 | 4.3 |
| light VGO, lighter fraction | 33 | 14.1 |
| light VGO, heavier fraction | 27 | 11.5 |
| heavy vacuum gas oil | 33 | 14.1 |
| heavy gas oil | 20 | 8.5 |
| TOP | 47 | 20.1 |
| Total | 234 | 100.0 |

TABLE 3

Process conditions.

| Conditions | Hydrotreating | Hydrocracking |
|---|---|---|
| LHSV ($h^{-1}$) | 0.8 | 1 |
| Pressure (bar) | 147 | 147 |
| Temperature SOR (° C.) | 380 | 345 |
| $H_2$/oil feed ($dm^3/dm^3$) | 950 | 850 |

The process was run with two sequential reactors (A, D) and two distillation units (B, C). The purpose of the first reactor in MHC is to remove nitrogen, sulphur and acidity of the feed. The aim of the second reactor is to crack the feed further and to adjust conversion to obtain desired bleed level. The distillation units were adjusted to separate products to fractions boiling below 180° C., boiling between 180° C. and 360° C., and a fraction boiling above 360° C. Further separation of the 180-360° C. fraction was performed in ex situ thin film distillation column to obtain 180-240° C. (aviation fuel component) and 240-360° C. (diesel) product fractions. Analysis of the separated kerosene fraction was performed. The results are presented in Table 4.

As seen from table 3, BOCLE lubricity of the aviation fuel component is below the maximum level of 0.85 mm of aviation fuel specification DEF STAN 91-091. Accordingly, the invention can be utilized to improve fuel lubricity without lubricity improver additive or to upgrade poorly lubricating fuel components.

TABLE 4

Analysis results of distilled aviation fuel component.

| Method | Analysis | Unit | Result |
|---|---|---|---|
| ENISO12185 | Density | kg/m$^3$ | 825 |
| ENISO3104 | kV-20° C. | mm$^2$/s | 6.653 |
| ASTMD1840 | Naphthalenes | vol-% | <0.01 |
| ASTMD1322 | Smoke point | mm | 22 |
| ASTMD3242 | TAN | mg KOH/g | 0.001 |
| EN12916 | AROM-MONO | wt-% | 8.0 |
| EN12916 | AROM-DI | wt-% | 0.1 |
| EN12916 | AROM-TRI | wt-% | 0.04 |
| EN12916 | AROM-LC | vol-% | 8.15 |
| ASTMD4809 | Cal Heating value | MJ/kg | 46.014 |
| ASTMD4809 | Net Heating value | MJ/kg | 43.136 |
| ASTMD5291 | Hydrogen | wt-% | 13.6 |
| ASTMD7345 | Dist-IBP | ° C. | 193.7 |
| ASTMD7345 | Dist-05$^a$ | ° C. | 200.5 |
| ASTMD7345 | Dist-10 | ° C. | 202.8 |
| ASTMD7345 | Dist-20 | ° C. | 206.5 |
| ASTMD7345 | Dist-30 | ° C. | 210.1 |
| ASTMD7345 | Dist-40 | ° C. | 214.3 |
| ASTMD7345 | Dist-50 | ° C. | 216.6 |
| ASTMD7345 | Dist-60 | ° C. | 219.6 |
| ASTMD7345 | Dist-70 | ° C. | 223 |
| ASTMD7345 | Dist-80 | ° C. | 226.9 |
| ASTMD7345 | Dist-90 | ° C. | 232.7 |
| ASTMD7345 | Dist-95 | ° C. | 238.7 |
| ASTMD7345 | Dist-TL | ° C. | 249.8 |
| ASTMD7345 | Dist-yield | vol-% | 98.1 |
| ASTMD7345 | Dist-residue | vol-% | 1.3 |
| ASTMD7345 | Dist-loss | vol-% | 0.7 |
| IP540 | Existent gum | mg/100 ml | 4 |
| ASTMD5001 | BOCLE Lubricity | mm | 0.73 |

$^a$Dist-05, Dist-10 etc. = the % of the fraction boiling at the defined temperature at 1 atm.

The specific examples provided in the description given above should not be construed as limiting the scope and/or the applicability of the appended claims.

What is claimed is:

1. A method for producing aviation fuel component, the method comprising:
   a) providing a feedstock containing 75-95% by weight fossil hydrotreatment feed and 5-25% by weight of a second feed, containing esters of fatty acids and rosins, free fatty acids and resin acids;
   b) subjecting the feedstock to hydrotreatment reaction conditions to produce a hydrotreated stream;
   c) separating at least part of the hydrotreated stream to:
      a fraction boiling below 180° C. at atmospheric pressure,
      a fraction boiling between 180° C. and 360° C. at atmospheric pressure, and
      a fraction boiling above 360° C. at atmospheric pressure;
   d) subjecting at least part of the fraction boiling above 360° C. at atmospheric pressure to hydrocracking reaction conditions to produce a hydrocracked stream;
   e) admixing at least part of the hydrocracked stream with at least part of the hydrotreated stream to provide a fractionation stream;
   f) separating the fractionation stream at least to:
      a fraction boiling below 180° C. at atmospheric pressure,
      a fraction boiling between 180° C. and 360° C. at atmospheric pressure, and
      a fraction boiling above 360° C. at atmospheric pressure; and
   g) separating the aviation fuel component from one or more fractions boiling between 180° C. and 360° C. at atmospheric pressure.

2. The method according to claim 1, wherein the second feed comprises:
   50-100% by weight tall oil pitch, and/or 75-100% by weight tall oil pitch, more and/or 90-100% by weight tall oil pitch, and/or 100% by weight tall oil pitch.

3. The method according to claim 1, wherein step d) comprises:
   removing at least 10% by weight, and/or 10-20% by weight of the fraction boiling above 360° C. at atmospheric pressure prior to the subjecting.

4. The method according to claim 1, comprising:
   recycling at least part of the fraction boiling above 360° C. at atmospheric pressure of step f) to step d).

5. The method according to claim 1, wherein the fossil hydrotreatment feed comprises:
   at least one or more of naphtha, light gas oil, gas oil, light vacuum gas oil, and/or heavy vacuum gas oil.

6. The method according to claim 1, wherein the feedstock comprises:
   80% by weight fossil hydrotreatment feed; and
   20% by weight tall oil pitch.

7. The method according to claim 1, wherein the hydrotreatment reaction conditions of step b) comprise:
   LHSV 0.5-2.0 and/or LHSV 0.7-1.2 h$^{-1}$, pressure 100-200 barg, and/or 130-160 barg, operating temperature 350-450° C., and/or 370-430° C., and H$_2$/feed 400-1000 dm$^3$/dm$^3$, and a one or more hydrotreatment catalysts.

8. The method according to claim 1, wherein the hydrocracking reaction conditions of step d) comprise:
   LHSV 0.5-2.0 h$^{-1}$, and/or LHVS 0.8-1.5 h$^{-1}$, pressure 100-200 barg, and/or 130-160 barg, operating temperature 330-390° C., and/or 340-380° C., and H$_2$/feed 400-1000 dm$^3$/dm$^3$, and one or more hydrocracking catalysts.

9. The method according to claim 1, wherein the separating comprises:
   distilling.

10. The method according to claim 1, comprising:
    fractionating the one or more fractions boiling between 180 and 360° C. at atmospheric pressure to:
    a fraction boiling at 180-240° C. at atmospheric pressure, and
    a fraction boiling at 240-360° C. at atmospheric pressure.

11. The method according to claim 10, wherein the fractionating comprises:
    thin film distilling.

12. The method according to claim 2, wherein step d) comprises:
    removing at least 10% by weight, and/or 10-20% by weight of the fraction boiling above 360° C. at atmospheric pressure prior to the subjecting.

13. The method according to claim 12, comprising:
    recycling at least part of the fraction boiling above 360° C. at atmospheric pressure of step f) to step d).

14. The method according to claim 13, wherein the fossil hydrotreatment feed comprises:
    at least one or more of naphtha, light gas oil, gas oil, light vacuum gas oil, and/or heavy vacuum gas oil.

15. The method according to claim 14, wherein the feedstock comprises:
    80% by weight fossil hydrotreatment feed; and
    20% by weight tall oil pitch.

16. The method according to claim 15, wherein the hydrotreatment reaction conditions of step b) comprise:

LHSV 0.5-2.0 and/or LHSV 0.7-1.2 $h^{-1}$, pressure 100-200 barg, and/or 130-160 barg, operating temperature 350-450° C., and/or 370-430° C., and $H_2$/feed 400-1000 $dm^3/dm^3$, and a one or more hydrotreatment catalysts.

17. The method according to claim 16, wherein the hydrocracking reaction conditions of step d) comprise:
LHSV 0.5-2.0 $h^{-1}$, and/or LHVS 0.8-1.5 $h^{-1}$, pressure 100-200 barg, and/or 130-160 barg, operating temperature 330-390° C., and/or 340-380° C., and $H_2$/feed 400-1000 $dm^3/dm^3$, and one or more hydrocracking catalysts.

18. The method according to claim 17, wherein the separating comprises:
distilling.

19. The method according to claim 18, comprising:
fractionating the one or more fractions boiling between 180 and 360° C. at atmospheric pressure to:
a fraction boiling at 180-240° C. at atmospheric pressure, and
a fraction boiling at 240-360° C. at atmospheric pressure.

20. The method according to claim 19, wherein the fractionating comprises:
thin film distilling.

* * * * *